United States Patent [19]

Arrow

[11] Patent Number: 4,682,438
[45] Date of Patent: Jul. 28, 1987

[54] FIGHTING CHAIR AND ROD HOLDER
[75] Inventor: Martin Arrow, Hampton Bays, N.Y.
[73] Assignee: Sanity Marine Products, Hampton Bays, N.Y.
[21] Appl. No.: 931,424
[22] Filed: Nov. 17, 1986
[51] Int. Cl.$^4$ .............................................. A01K 97/10
[52] U.S. Cl. ...................................... 43/21.2; 108/48; 297/14
[58] Field of Search .............. 43/21.2, 54.1; 297/217, 297/188, 297, 14; 108/48, 157; 248/515, 516, 240.4

[56] References Cited

U.S. PATENT DOCUMENTS

| | | | |
|---|---|---|---|
| 695,324 | 3/1902 | Montague | 108/48 |
| 1,137,172 | 4/1915 | Stewart | 108/48 |
| 1,223,884 | 4/1917 | Johnstone | 297/217 |
| 1,331,635 | 2/1920 | Flaherty | 108/48 |
| 1,985,985 | 1/1935 | Gerline | 43/21.2 |
| 3,531,888 | 10/1970 | Wells | 43/21.2 |
| 3,745,690 | 7/1973 | Lewis | 43/21.2 |
| 3,851,916 | 12/1974 | Quartullo | 297/188 |
| 3,964,706 | 6/1976 | Adams | 43/21.2 |
| 4,017,998 | 4/1977 | Dumler | 43/21.2 |
| 4,375,731 | 3/1983 | Budd | 43/21.2 |
| 4,460,216 | 7/1984 | Keller | 297/217 |
| 4,485,579 | 12/1984 | Hawie | 43/21.2 |
| 4,578,891 | 4/1986 | Murray | 43/21.2 |

Primary Examiner—Gene P. Crosby
Attorney, Agent, or Firm—Richard C. Woodbridge

[57] ABSTRACT

A fighting chair includes a rod holder that permits the fishing rod to rotate about its longitudinal axis. When not in use the chair can be stored flat against the gunnel of a small boat. The chair is erected by raising the flat portion thereof upwardly and inserting a support leg into sockets attached to the underside of the seat. A gimbal mounted rod receiver is attached to the seat of the chair and is adapted to receive the butt end of a fishing rod of the type that includes a groove or grooves therein. The rod receiver includes in its base a rotatable pin that engages the grooves in the butt of the rod. Since the fighting chair cannot rotate, the rotatable pin in the receiver permits the fishing rod to follow the fish. When not in use the chair can be stored flat against the gunnel of the boat, or, alternatively, can be removed and stored on land or below ship.

9 Claims, 8 Drawing Figures

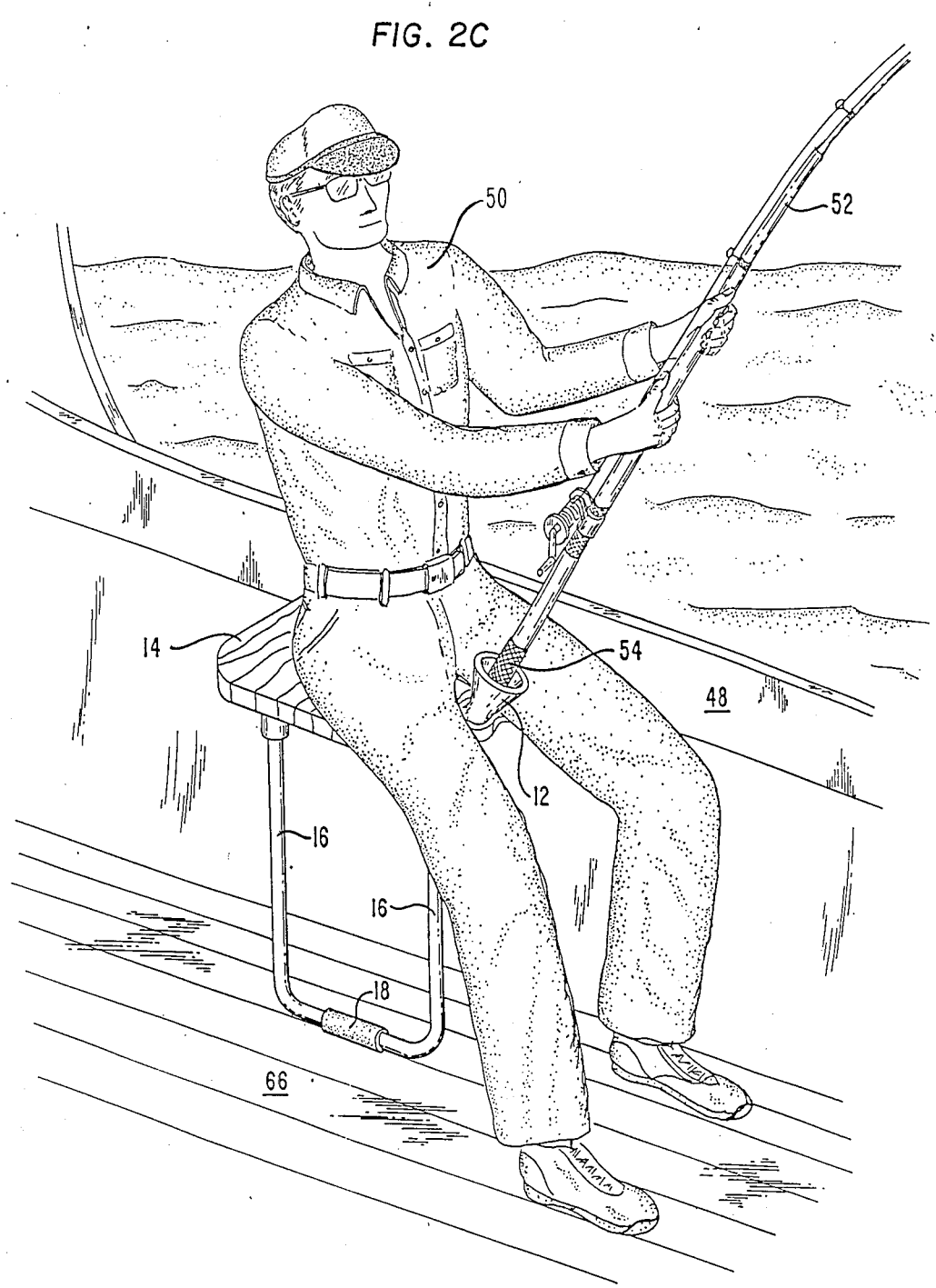

FIGHTING CHAIR AND ROD HOLDER

BACKGROUND OF THE INVENTION

1. Field of the Invention

The invention relates to a fighting chair including a gimbal mounted rod holder.

2. Description of Related Art

Most conventional fighting chairs are mounted on a rotatable base so that the chair can follow the pull of the fish. Typically the chair is equipped with a rod holder adapted to accept the butt of the fishing rod and mounted so that the rod can move forward and back and from side to side. However, rotational motion of the rod is generally precluded because the chair can swivel. While fighting chairs of the sort just described are useful on large boats, they tend to be too large and expensive for small boats.

In view of the foregoing need, the inventor has discovered a collapsible chair/rod holder combination that is relatively inexpensive to manufacture and easy to store and erect. The use of rod holders is known in the context of fighting chairs. However, there do not appear to be acceptable rod holders on the market or otherwise that adequately permit a fishing pole to rotate in the context of a collapsible fighting chair. Several prior art references disclose the use of a pin adapted to engage a slot in the butt of a fishing rod in order to prevent rotational movement. See for example, U.S. Pat. No. 4,375,731 which discloses the use of a pin in the bottom of a rod holder for the purpose of preventing rotation. U.S. Pat. No. 3,964,706 discloses a similar locking pin for the same purpose. The following U.S. Pat. references may also be relevant with regard to fishing rod holders: U.S. Pat. Nos. 3,351,888; 3,745,690; 3,851,916; 4,017,998; 4,485,579 and 4,578,891.

It was in the context of the foregoing prior art that the present invention arose.

SUMMARY OF THE INVENTION

Briefly described the invention comprises a collapsible fighting chair adapted for mounting on the gunnel of a boat and including a rod holder that permits a fishing rod to rotate. The chair preferably comprises a flat seat having two hook brackets at one edge thereof for engaging a pair of bar brackets attached to wooden blocks 23 and bolted to the gunnel of a small fishing craft. A U-shaped leg is stored in storage tubes mounted on the bottom side of the seat so that the leg is stored in a flat orientation. In that position the chair can be easily removed and taken on shore or can be left in the vertical storage position indefinitely until its use is required. When employed for use the U-shaped leg is withdrawn from the storage tubes and the free ends thereof inserted into receiving sockets on the bottom side of the seat. The seat is thus secured in the horizontal mode by the hooks on one edge and the erected leg on the other edge.

The user of the invention typically sits on the chair in a side saddle fashion with the rod holder between his or her legs. A conventional fishing rod of the sort that includes slots in the butt thereof is received in the rod holder and straddles a rotatable pin mounted near the bottom thereof. The rod holder is gimbal mounted so that it can move forward and backward and from side to side. A rotatable ring supports both ends of the pin. An upper and lower polytetrafluoroethylene washer permits the ring carried pin to rotate freely within the cylindrical housing of the rod holder. Therefore, the fishing rod can easily follow the fish while the fighting chair stays stationary.

These and other features of the present invention are set forth in the following drawings.

BRIEF DESCRIPTION OF THE DRAWINGS

FIG. 2C illustrates an erected fighting chair and rod holder apparatus shown in use on a boat.

DETAILED DESCRIPTION OF THE INVENTION

During the course of this description like numbers will be used to identify like elements according to the different views that illustrate the invention.

Figure 1A:
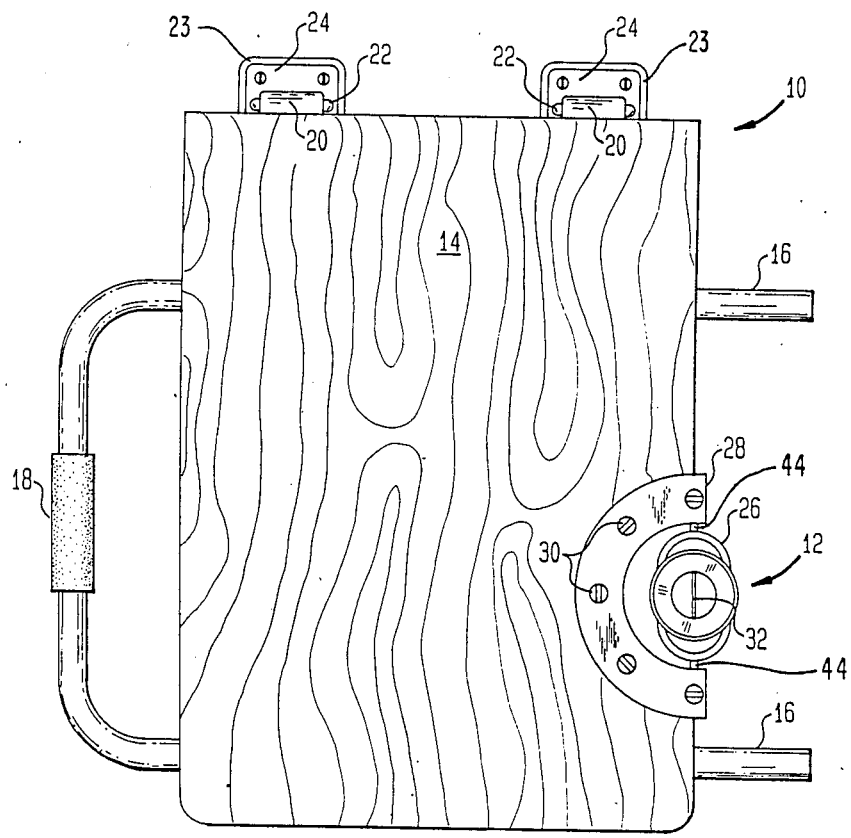
FIG. 1A is a top plan view of the fighting chair and rod holder apparatus according to the preferred embodiment of the invention illustrated in the stored, vertical position.
Figure 1B:
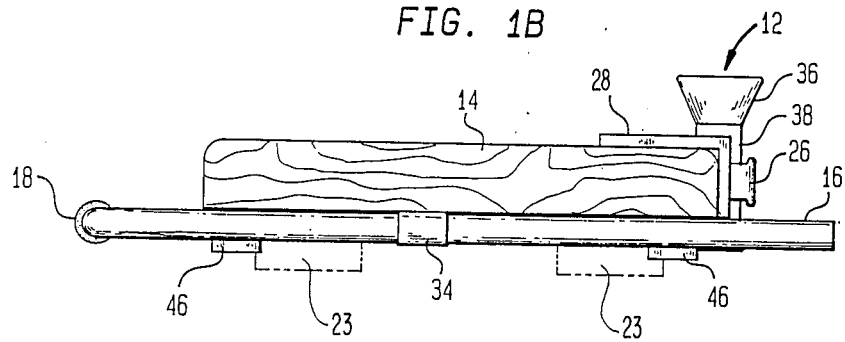
FIG. 1B is an end view of the fighting chair and rod holder apparatus shown in the collapsed mode.
Figure 1C:
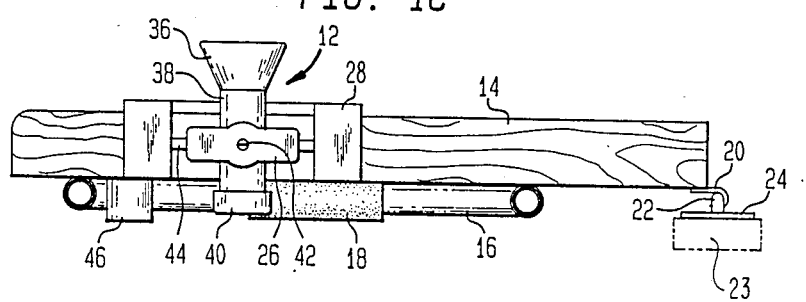
FIG. 1C is a partial cut-away side view of the fighting chair and rod holder apparatus shown in FIGS. 1A and 1B.

FIGS. 1A, 1B and 1C illustrate the fighting chair and rod holder apparatus 10 according to the preferred embodiment of the invention. A rod holder 12 is attached to a flat seat 14 which in turn is mounted on extended bars 22 by a pair of hooks 20. Bars 22 are attached by mounting plates 24 attached to wooden blocks 23 and bolted to the side gunnel 48 of a small fishing boat. A U-shaped leg 16 formed from a hollow anondized aluminum rod is held by storage tubes 34 to the bottom surface of seat 14. A tubular resilient foot 18 is located at the common portion of the leg 16 and is employed to prevent leg 16 from slipping or marring deck floor 66 when the invention 10 is in its erected state as illustrated in FIG. 2C.

Rod holder 12 includes an upper flaired, funnel shaped portion 36, connected to a cylindrical body portion 38 and a screw-on cap bottom portion 40. Socket set screw 42 connects the cylindrical body portion 38 to a gimbal 26. Socket set screw 42 permits the rod holder 12 to move side to side as constrained by gimbal 26. Gimbal 26 is in turn mounted on socket set screw 44 attached to mounting plate 28. Socket set screws 44 are received in apertures 68 of gimbal 26 shown in FIG. 3B and permit the rod holder 12 to move forward and backward. Mounting plate 28 is firmly attached by conventional screws 30 to flat seat 14. A rotatable pin 32, illustrated in FIG. 1A is adapted to engage the slots 72 in the butt 54 of a conventional fishing rod 52 as shown in part in FIG. 3A.

Figure 2B:
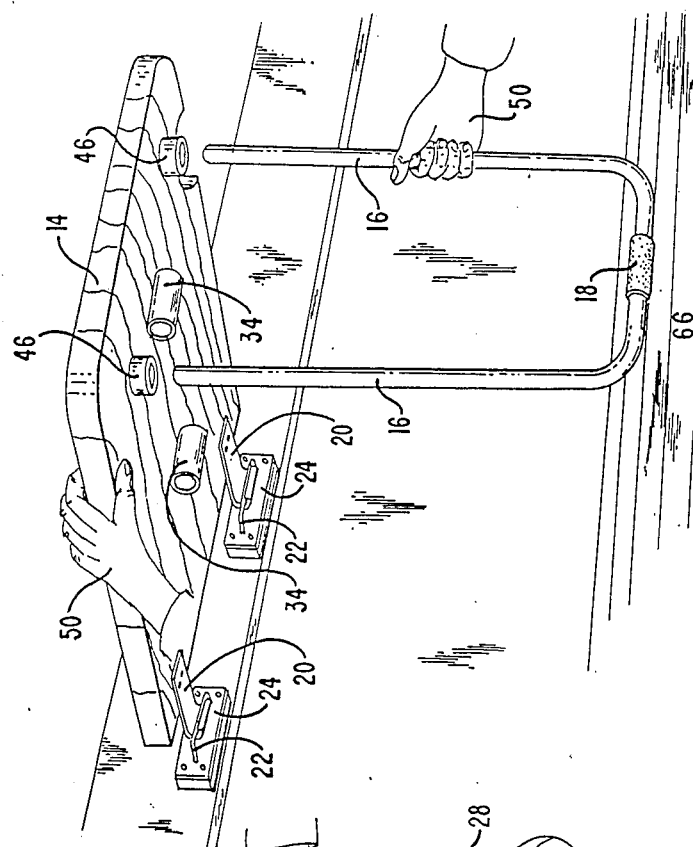
FIGS. 2A and 2B illustrate steps of the method by which the fighting chair and rod holder apparatus are erected for use.
Figure 2A:
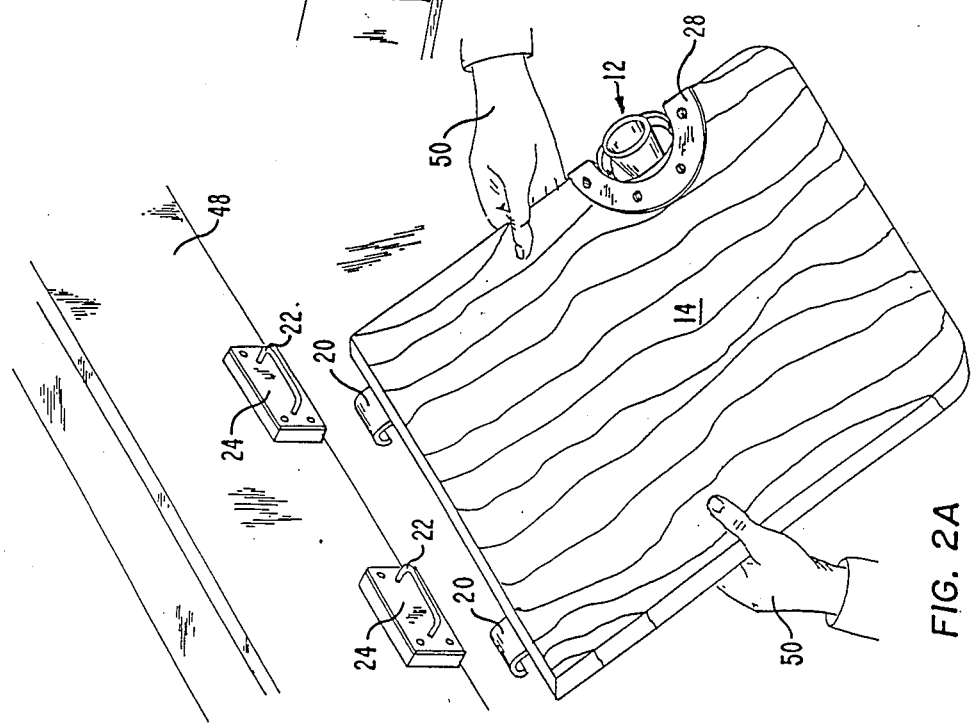

FIGS. 2A and 2B illustrate the manner in which the invention 10 illustrated in its vertically, storable state in FIGS. 1A through 1C is brought into its erected horizontal state. Initially, the fisherman 50 attaches, or reattaches hooks 20 to bars 22 as shown in FIG. 2A and then rotates the seat 14 from its vertical stored position to a relatively horizontal position as shown in FIG. 2B. Fisherman 50 then removes the leg 16 from storage tubes 34 and inserts the ends thereof in receiving sockets 46. Seat 14 is therefore supported at one edge by hooks 20 and at the other edge by leg 16. Resilient tubular foot portion 18 helps to prevent the leg 16 from slipping on or marring deck 66.

A fisherman 50 is shown using the invention 10 in FIG. 2C. Typically the fisherman 50 sits on the seat 14 in a side saddle-like fashion. Since the seat 14 can't move, it is important that the rod 52 be capable of rotating within the rod holder 12. Otherwise the fisherman 50 would be fighting the fish from an awkward angle. Rotation of rod 52 is accomplished by the use of a rotatable mounting pin 32 housed near the base of rod holder 12.

Figure 3A:
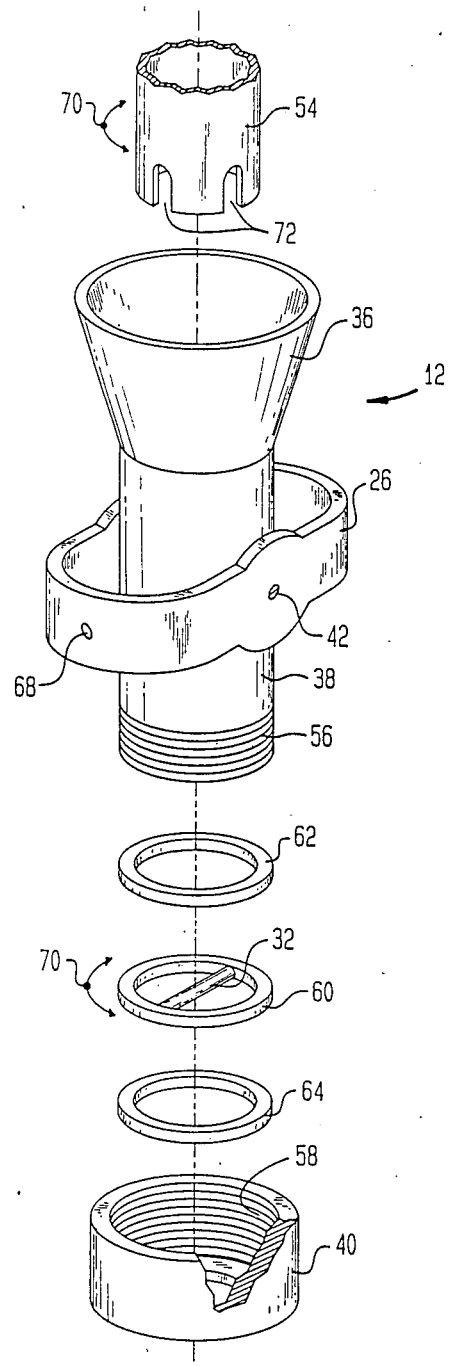
FIG. 3A is an exploded view of the rod holder.
Figure 3B:
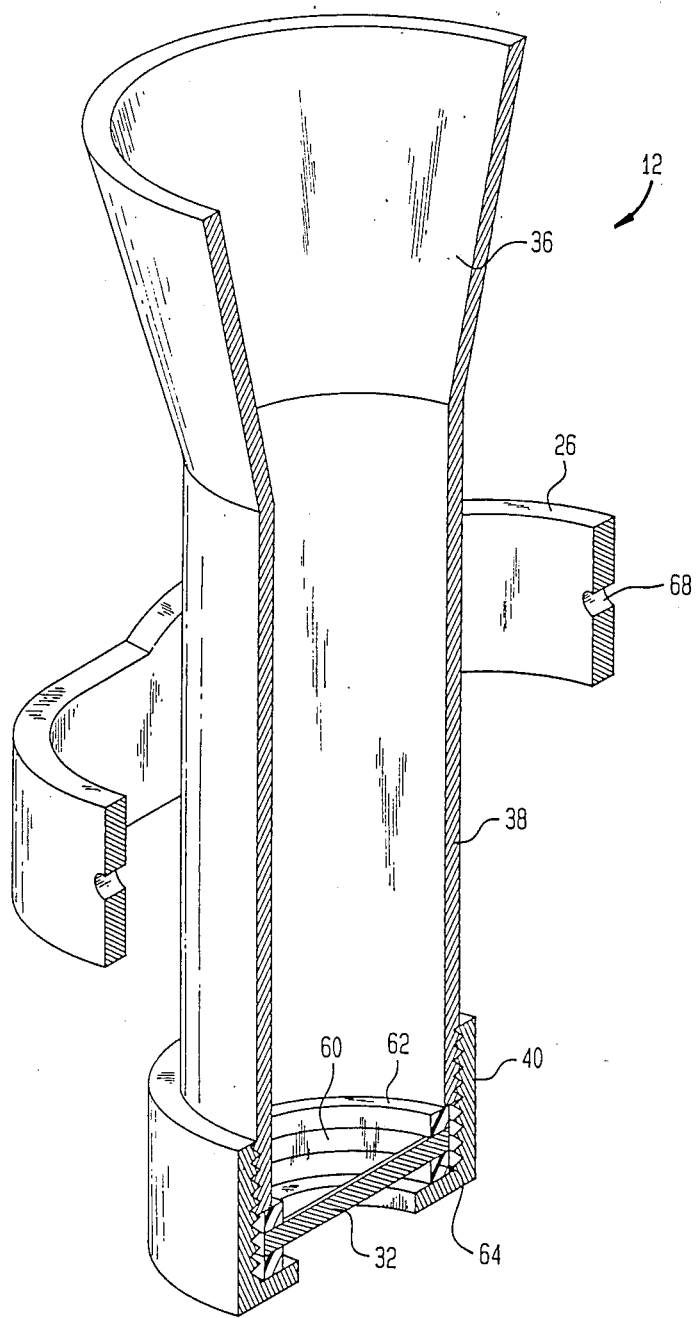
FIG. 3B is a cut-away assembly view of the rod holder.

FIGS. 3A and 3B illustrate the rotatable pin aspect of the invention 10 in both exploded and partial cut-away assembly views. The butt 54 of many conventional fishing rods 52 includes slots 72 therein adapted to engage a non-rotatable mounting pin in a conventional rod holder. However, according to the present invention, it is possible to rotate rod 52 either clockwise or counter clockwise in the direction of arrow 70 by mounting pin 32 in a novel manner. According to the preferred embodiment of the invention 10, mounting pin 32 is attached at both ends thereof to a ring 60. Mounting pin 32 lies across the diameter and center of ring 60 so as to optimally engage slots 72. A pair of substantially frictionless washers 62 and 64 are located respectively above and below rotatable mounting ring 60. Washers 62 and 64 are preferaly formed from a tetrafluoroethylene material such as Teflon ® of its equivalent. Teflon ® is a registered trademark of E.I. DuPont de Nemours & Company, Wilmington, Del. Rotatable mounting ring 60 and washers 62 and 64 are held in place by bottom cap 40. Threads 58 in cap 40 are engageable with threads 56 in the cylindrical body portion 38 of rod holder 12. FIG. 3B illustrates the assembled unit in a partial cross-sectional view. As previously described, slot 72 straddles and engages pin 32 thereby permitting the butt 54 to rotate in either the clockwise or counter clockwise direction 70 when held in rod holder 12.

The invention thus described has several advantages over the proir art. First of all, it is substantially less expensive to manufacture and sell than conventional swiveled fighting chairs. Second, conventional fighting chairs take up a lot of space and are therefore unsuitable for many small boats. The present invention overcomes this problem by being completely collapsible and storable against the gunnel of a small boat. This takes the fighting chair out of the way of the normally busy transom area. Third, the present invention can also be used on large boats in conjunction with conventional fighting chairs where additional passenger capacity is desired. Fourth, the ability of the present invention to accept conventional fishing rods of the sort having slots in the butt thereof makes the invention useable with many conventional fishing outfits. Fifth, by permitting rod rotation within the rod holder the user of the fighting chair apparatus has essentially all the same advantages as the user of a more expensive, bulkier fighting chair. Sixth, the rod holder is easily disassembled for cleaning and the chair may be readily removed from the boat by simply disconnecting hooks 20 from bars 22. Seventh, and lastly, the invention is relatively safe to use when erected because it is difficult for the seat to collapse since it is firmly attached to the gunnel 48 of the boat at one edge and supported securely at the other edge by the inherent strength of U-shaped leg unit 16.

According to the preferred embodiment 10 the seat 14 is preferably made out of a high quality wood material such as teak. In order to avoid corrosion, the metal parts of the invention 12 are preferably formed from brass with a chrome coating or stainless steel.

While the invention has been described with reference to the preferred embodiment thereof, it is clear that modifications can be made to the structure and elements that comprise the invention without departing from the spirit and scope thereof.

I claim:

1. An apparatus for holding a fishing rod comprising:
   a receiver for receiving the butt of a fishing rod;
   means to allow said receiver to move forward and back and from left to right; and,
   rotational means mounted in said rod receiver for engaging a slot in the butt of said fishing rod and for permitting said rod to rotate around its long axis while supported in said receiver.

2. The apparatus of claim 1 wherein said rotational means comprises:
   a pin receivable in at least one slot in the butt of said fishing rod; and,
   a ring rotatably receivable in and supported by said rod receiver,
   wherein said pin is attached at both ends to said ring so that the pin diagonally passes through the geometric center of said ring.

3. The apparatus of claim 2 further comprising:
   a first friction reducing washer means for reducing the friction between a first side of said ring and said rod receiver.

4. The apparatus of claim 3 further comprising:
   a second friction reducing washer means for reducing the friction between a second side of said ring and said rod receiver.

5. The apparatus of claim 4 wherein said first and second friction reducing washer means comprise a tetraflorethylene material.

6. The apparatus of claim 5 further comprising:
   a seat; and,
   a means for rigidly attaching said seat to a boat so that said seat does not rotate,
   wherein said rod receiver is attached to said seat.

7. The apparatus of claim 6 further including:
   collapsing means to permit said seat to be folded up flat against the gunnel of said boat when not in use.

8. The apparatus of claim 7 wherein said collapsing means comprises:
   detachable leg means which are attachable adjacent one edge of said seat when said seat is in the erected state and storably attachable to said seat when said seat is in a storage, collapsed state;
   releasable bar bracket means mountable to the gunnel of said boat; and,
   hook bracket means attachable to said releasable bar bracket means and connected to another edge of said seat for supporting said seat on said gunnel in both the collapsed and erected states.

9. The apparatus of claim 8 wherein said means for allowing front and back and right and left movement of said rod receiver comprises a gimbal.

* * * * *